United States Patent [19]

Bolin

[11] 4,319,101

[45] Mar. 9, 1982

[54] SEQUENTIAL TIMER WITH PROGRAMMABLE DUAL FREQUENCY DRIVE

[75] Inventor: Donald E. Bolin, Franklin, Tenn.

[73] Assignee: The Scott & Fetzer Company, Fairview, Tenn.

[21] Appl. No.: 119,197

[22] Filed: Feb. 6, 1980

[51] Int. Cl.[3] .................................... F16H 29/00

[52] U.S. Cl. .................................... 200/38 R; 74/116

[58] Field of Search .............. 200/38 C, 27 B, 38 BA, 200/38 CA, 38 B, 38 R; 74/116, 120–125, 568 T, 575, 577, 578

[56] References Cited

U.S. PATENT DOCUMENTS

| | | | |
|---|---|---|---|
| 1,735,923 | 11/1929 | Helgeby | 74/116 |
| 2,703,347 | 3/1955 | Constantine | 200/38 C |
| 3,738,185 | 6/1973 | Wooley | 74/116 |
| 3,857,293 | 12/1974 | Godwin et al. | 74/118 |

*Primary Examiner*—J. D. Miller
*Assistant Examiner*—D. L. Rebsch
*Attorney, Agent, or Firm*—Pearne, Gordon, Sessions, McCoy & Granger

[57] ABSTRACT

There is disclosed a sequential timer with a programmable dual frequency drive. The timer includes a relatively flat housing which mounts a circular, flat disk having arcuate switch actuating cams on at least one face thereof. A plurality of switches are mounted in the housing and are sequentially actuated by the arcuate cams upon rotation of the disc. Drive pawls are provided which coact with teeth on the periphery of the disk. One of said pawls is driven at a multiple of the frequency of the other pawl so that the disk is driven at a relatively rapid rate of advance when the disk is performing a switching function and at a relatively slow rate of advance during a steady operation state.

6 Claims, 7 Drawing Figures

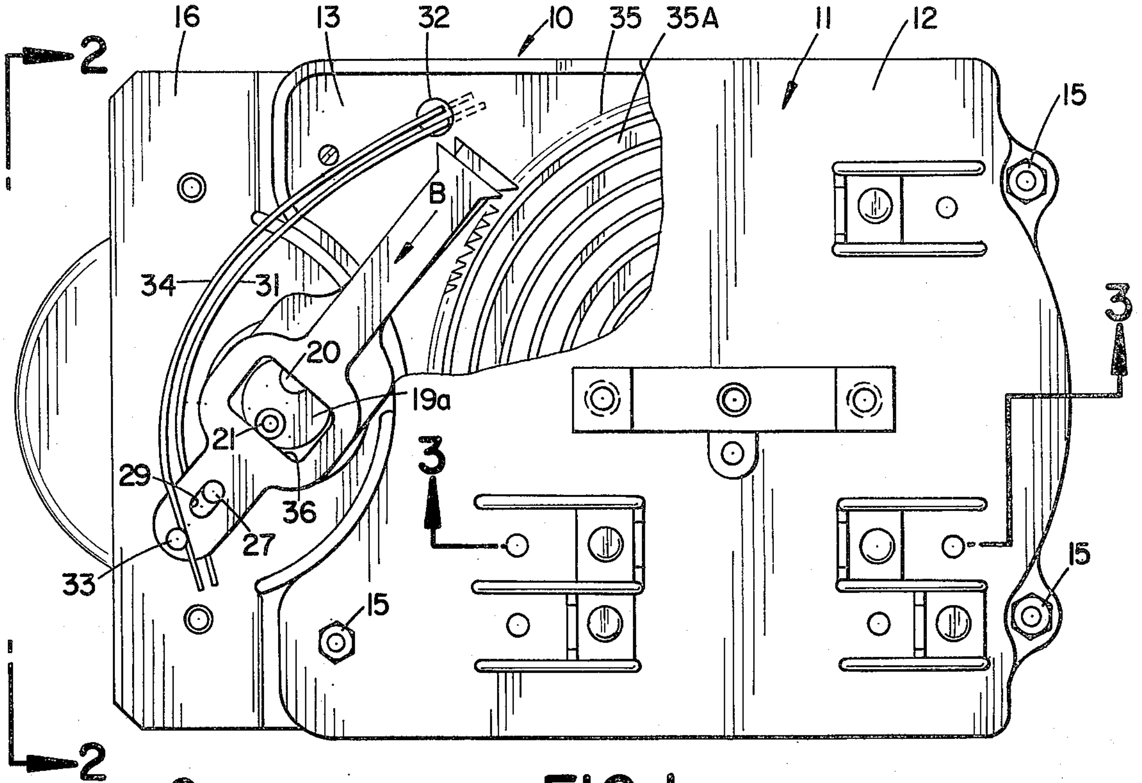
FIG. 1
FIG. 2
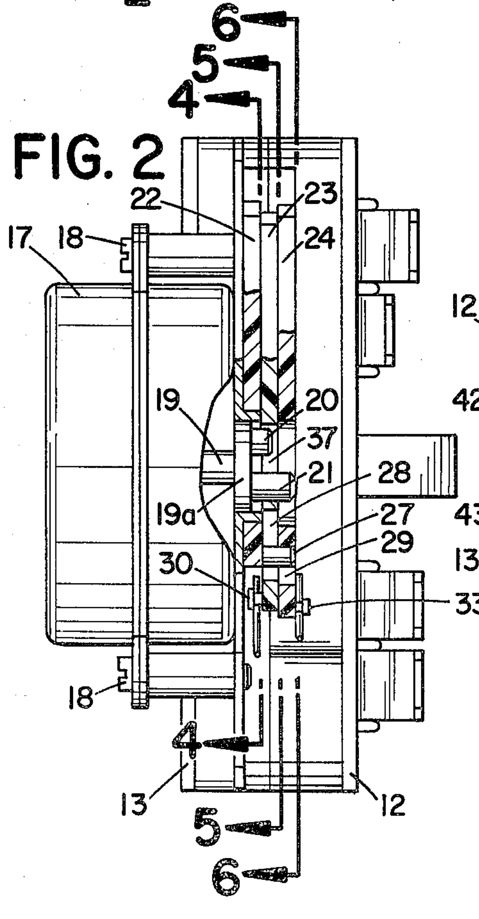
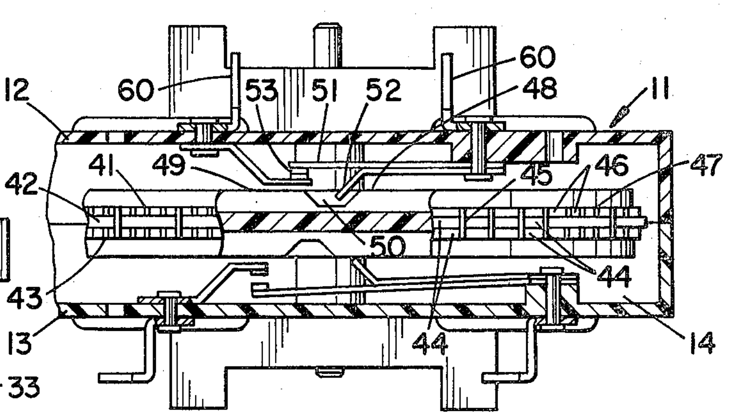
FIG. 3

SINGLE FREQUENCY DRIVE LEVER
ONE ORBIT OF DOUBLE ECCENTRIC.

DOUBLE FREQUENCY DRIVE LEVER.
ONE ORBIT OF DOUBLE ECCENTRIC.

SEQUENTIAL TIMER WITH PROGRAMMABLE DUAL FREQUENCY DRIVE

BACKGROUND OF THE INVENTION

This invention relates to appliance timers and, particularly, to an appliance timer having a dual frequency drive.

Although the principles of the present invention may be included in various timers, a particular application is made in timers of the type employed to control the various circuits and functions of automatic laundry appliances such as washers and dryers. Appliance timers basically comprise a rotatable member having a plurality of projecting cams which sequentially engage switch members which control the various operations of the appliance.

Basically there are two types of timers for home appliances. One such timer is a cylindrical rotary drum having a plurality of cams projecting from its surface which engage switch members and is quite similar to a music box. A principal disadvantage of such a timer is that it is bulky and it is difficult to mount the timer in the limited space requirements dictated by the appliance manufacturer. A more acceptable timer as far as space requirements are concerned is the timer set forth in U.S. Pat. No. 2,703,347 to A. R. Constantine, issued Mar. 1, 1955. According to that patent, the appliance timer comprises a flat disk mounted in a housing and having ratchet teeth on its periphery. The disk is driven incrementally about a central shaft by a pawl, which in turn is driven in a reciprocal manner by a synchronous motor. At least one face of the disk is provided with arcuate cam surfaces which are concentrically arranged about the face or faces of the disk. Switch members are arranged about the faces of the housing to engage the arcuate cam members upon rotation of the disk. Electric connectors cooperate with the switch members to control the various cycles of the appliance.

It is desirable that the disk be driven at a very slow rate of advance, since one rotation of the disk should complete at least one entire cycle of the machine. It is also desirable that the disk be driven at a higher rate of advance during switching operations to increase the accuracy of those operations and to decrease arcing, since slow make-break switching promoters arcing and therefore, increased switch wear.

SUMMARY OF THE INVENTION

This invention overcomes many of these prior art problems and provides an improvement over prior art appliance timers, such as the timer described in the above-noted patent to Constantine.

More specifically, this application provides an appliance timer having a dual frequency drive that may be programmed so that switching operations are carried out by relatively fast advance of the disk while normal operating conditions are carried out by relatively slow advance of the disk. Areas dedicated to switching operations may be expanded and conversly areas dedicated to normal operating conditions may be compressed. Thus, disks may be preprogrammed to meet the demands of appliance manufacturers who require increasingly more complex cycles in an appliance.

The timer according to this invention comprises a disk mounted for rotation within a relatively flat casing. The disk is provided with a number of arcuate and concentric cams on at least one of its faces. A plurality of cam actuated switches cooperate with the arcuate cams to control the various switching functions of the appliance. A preselected array of ratchet teeth are provided on the periphery of the disk and a pair of pawls are provided to drive the disk by engaging the teeth. A mechanism is provided to drive one pawl at twice the frequency of the other pawl so that the disk is driven at two different rates of advance and in a predetermined program sequence. The slower rate of advance is employed during portions of the cycle wherein a particular operation is being performed, such as a drying cycle, a rinse cycle, or a wash cycle. The more rapid rate of advance portion of the program is employed to advance the disk rapidly during a switching function from one operating cycle to another. Thus, the periphery of the disk would be notched for slow rate of advance along an arcuate extent which includes a segment containing the cams which control steady operation of a cycle and with the periphery notched for a more rapid rate of advance along an arc which defines a segment containing the cycle switching cams.

The mechanism for driving the pawls includes a wheel having a pair of diametrically opposed and eccentrically orbited pins mounted therein which engage cam surfaces defined by apertures in the pawls which are stacked on top of each other. A first one of the pins protrudes for an extent sufficient to operate the cam aperture on the lowermost pawl and the second pin projects a further distance which is sufficient to operate the cam apertures on both of the pawls.

BRIEF DESCRIPTION OF THE DRAWINGS

FIG. 1 is a plan view of an appliance timer according to this invention with portions of the timer broken away to show details of the operation;

FIG. 2 is an end elevational view of the timer with portions broken away, the plane of the view being illustrated by the line 2—2 in FIG. 1;

FIG. 3 is a sectional view, the plane of the section being indicated by the line 3—3 in FIG. 1;

DETAILED DESCRIPTION OF THE INVENTION

Figure 4:
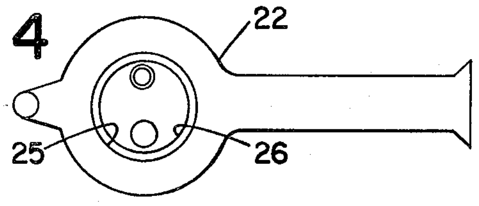
FIG. 4 is a view of the "no-back" pawl, the position of which in the assembly is indicated by the line 4—4 in FIG. 2.

Referring now to the drawings and, particularly, to FIGS. 1-3, there is illustrated a sequential timer 10 for appliances such as dishwashers, clothes washers, clothes dryers, and the like, which includes a casing 11. The casing 11 comprises two identical and mating halves 12 and 13 which cooperate to form a relatively narrow chamber 14. The mating halves 12 and 13 are held together by a plurality of bolts 15. A mounting plate 16 is affixed to one end of the casing 11 and a synchronous motor 17 is affixed to the mounting plate by fasteners 18. The motor 17 has an output shaft (not shown) which drives a shaft 19 through a series of reduction gears (not shown). The shaft 19 has a disk-shaped head 19*a* which is provided with diametrically opposed and eccentrically positioned drive pins 20 and 21 which, when the shaft 19 is driven, orbit about the axis of the shaft 19.

Figure 5:
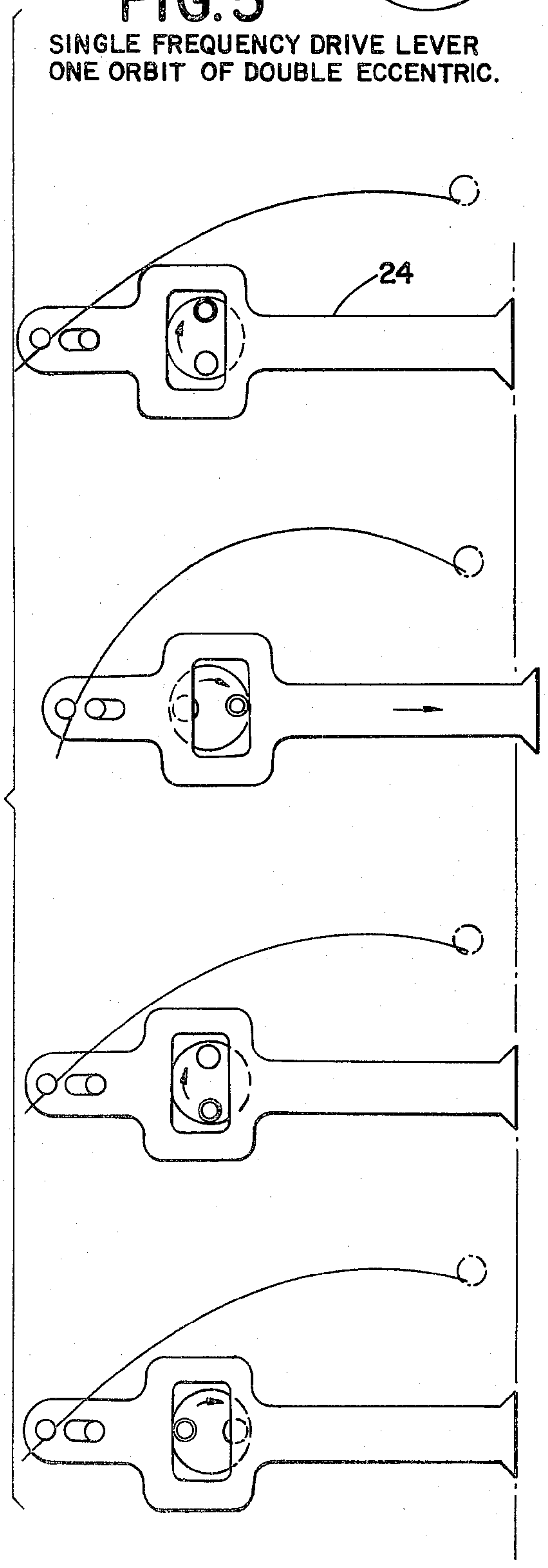
FIG. 5 is an illustration of the single frequency drive pawl in its various driven conditions, the position of the pawl in the assembly being illustrated by the line 6—6 in FIG. 2.

Located to interact with the pins 20 and 21 are three pawls 22, 23 and 24. The pawls are located on the enlarged head 19*a* by an aperture 25 of the pawl 22 embracing an annular flange 26 of the mounting plate 16. The enlarged head 19*a* extends into the flange 26 so that the pawl 22 is not acted upon by the enlarged head 19*a* or its pins 20 and 21. The pawl 22 has a post 27 which projects through a slot 28 in the pawl 23 and into a slot 29 in the pawl 24. The pawl 23 has a headed projection 30 at one end which acts as an abutment for a wire spring 31 which extends between the abutment 30 and is bent downwardly to be captured in an aperture 32 in the casing half 13. Similarly, the pawl 24 carries a projecting headed pin 33 at its lower end which acts as an abutment for a wire spring 34. The springs 31 and 34 bias the pawls 22, 23 and 24 against a flat disk 35A which serves as the cycle program disk for the timer. The springs 31 and 34 also bias the pawls 23 and 24 in a direction indicated by the arrow B in FIG. 1, since the pawl 22 is incapable of longitudinal movement and since its post 27 acting in the slots 28 and 29 permits longitudinal and relative movements of the pawls 23 and 24. Longitudinal movement of the pawl 24 is solely caused by the pin 21 acting in a cam aperture 36 in the pawl 24. Thus, as may be seen in FIG. 5, a single orbit of the pin 21 drives the pawl 24 through a single stroke.

Figure 6:
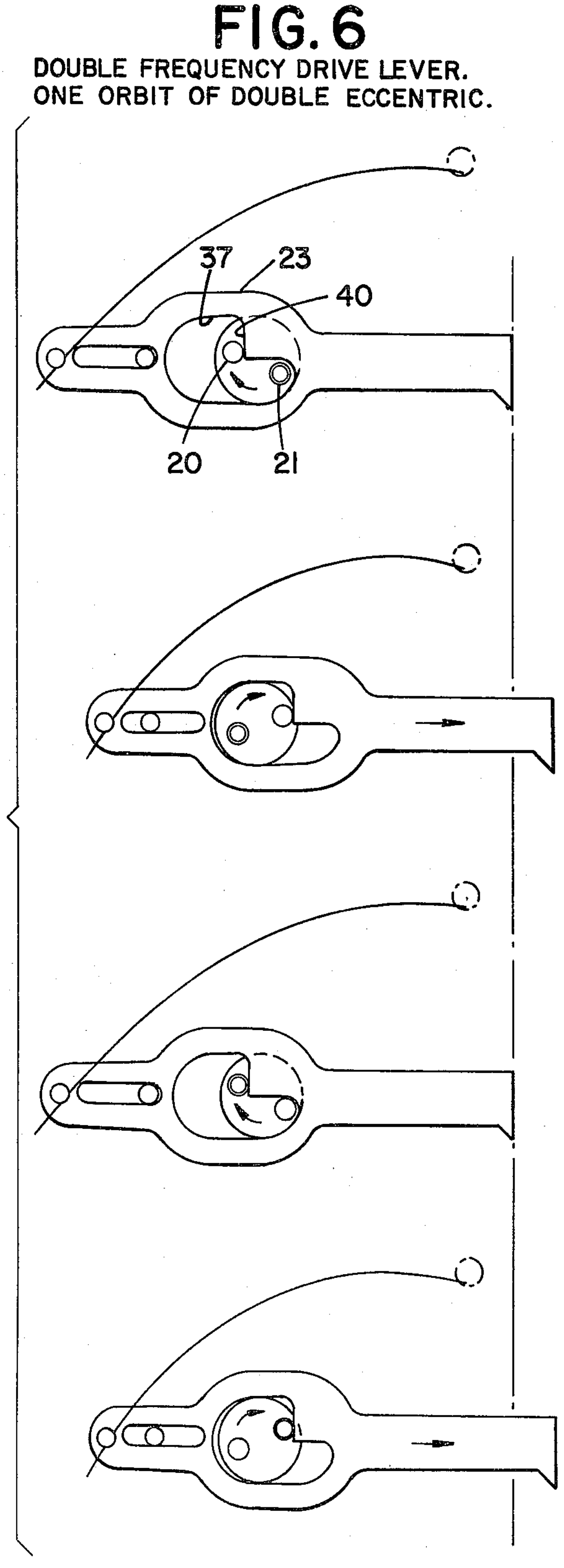
FIG. 6 is an illustration of the double frequency drive pawl in its various driven positions, the position of the pawl being indicated by the line 5—5 in FIG. 2.
Figure 7:
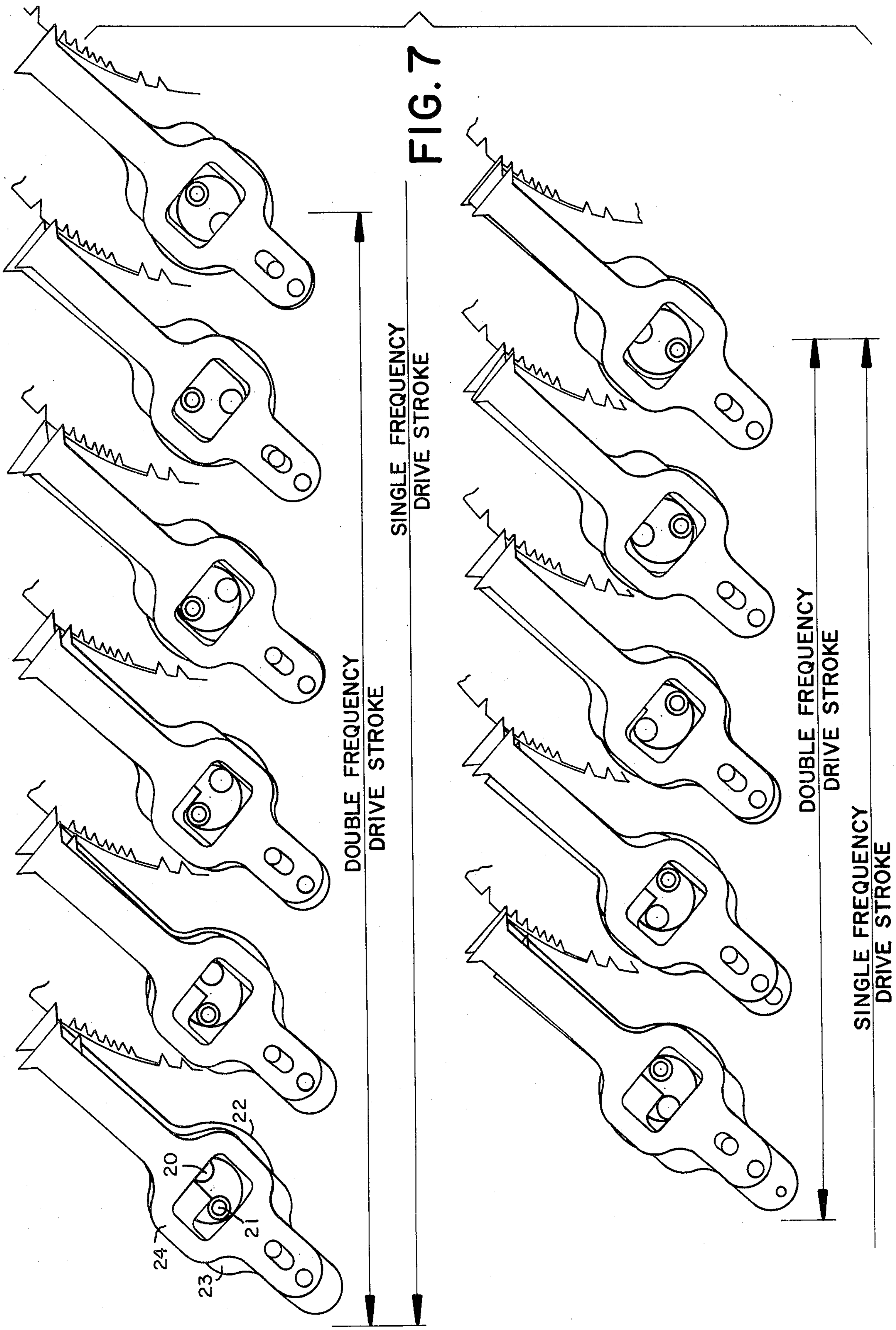
FIG. 7 is an illustration which progressively shows the drive relationship between the single frequency drive pawl and the double frequency drive pawl during one orbit of the eccentric pins.

Longitudinal movement of the pawl 23 is caused by both pins 20 and 21 coacting with a ledge 40 of the cam aperture 37 in the pawl 23. Thus, as may be seen in FIG. 6, the pin 20 initially moves the pawl 23 forward until it reaches the end of the ledge 40 (at which time, the pawl 23 is at the forwardmost portion of its stroke) and then drops off the ledge to permit the pawl 23 to snap back. However, when the pawl 23 snaps back, the ledge 40 is immediately engaged by the pin 21, which forces the pawl 23 forwardly for its second stroke.

All three pawls serve to act on the peripheral tooth ring 35. The pawl 22 acts as a "no-back" pawl to prevent the pawls 23 and 24 from dragging the cam disk in a counterclockwise direction as viewed in FIG. 1. The pawl 22 cooperates with a row of teeth 43 to perform its function. The pawls 23 and 24 respectively operate on a row of teeth 42 and a row of teeth 41. The teeth spacing of the teeth 41 and 42 may be programmed to meet various timing requirements. In the illustrated embodiment, there is illustrated an arrangement wherein the tracks 41 and 43 have a zone where the teeth 44 in each track are evenly spaced. The spaces 45 between the teeth 44 are sequentially engaged by the double frequency pawl 23 to drive the cam wheel 35 at a relatively rapid rate. However, when the pawls attain a position to engage teeth 46 which are closely spaced, the single frequency pawl sequentially engages those teeth while the double frequency pawl tends to idle on a relatively long tooth 47.

As is more fully set forth in U.S. Pat. No. 2,703,347, the disk 35A is provided with a plurality of concentric and arcuate cam members 48 on its faces. The cam members 48 have crests 49 and valleys 50 which cooperate with a plurality of switches 51 to control the various functions of the appliance. Thus, as a switch arm 52 remains in a valley 50, switch contacts 53 remain closed. When the switch arm 52 rides up a crest 48, the contacts 53 are opened. During this switching function, it is desirable to open the contacts as rapidly as possible to decrease arcing. Therefore, the peripheral teeth 44 are located relative to the pawls to perform the more rapid advance of the disk. The teeth 46 are sequentially engaged by the single stroke pawl 24 to perform a slower rate of advance of the disk when one of the machine's cycles is in operation.

The switches 51 are connected through the casing 12 to terminal posts 60 which are attached to quick disconnect connectors of the appliances wiring harness.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A sequential timer with a programmable dual frequency drive comprising means defining a housing, a main program cam comprising a circular flat disc having arcuate switch actuating cams on at least one face thereof, a plurality of switches mounted in said housing and being sequentially actuated by said arcuate cams upon rotation of said program disc, drive means including a constant speed motor, said disc having at least two sets of circularly arranged teeth on the periphery of the disc, and at least two pawls coacting with said circularly arranged teeth, means driven by said motor to drive said pawls so that said pawls incrementally advance said program disc, said drive means driving one of said pawls at a multiple of the frequency of another pawl.

2. A sequential timer according to claim 1, wherein said multiple is two.

3. A sequential timer with a programmable dual frequency drive comprising means defining a housing, a main program cam comprising a circular flat disc having arcuate switch actuating cams on at least one face thereof, a plurality of switches mounted in said housing and being sequentially actuated by said arcuate cams upon rotation of said program disc, means to drive said program disc at at least two different rates of advance and in a predetermined program sequence, said drive means including a constant speed motor, said disc having at least two sets of circularly arranged teeth on the periphery of the disc, at least two pawls coacting with said circularly arranged teeth and driven by said motor to incrementally advance said program disc, said constant speed motor having an output shaft provided with a pair of pins, a first one of said pins cooperating with cam means on said one of said pawls to drive said one of said pawls at a first frequency, a second one of said pins cooperating with cam means on said another pawl to drive said another of said pawls at a second frequency.

4. A sequential timer according to claim 3, wherein said first pin cooperates with both of said cam means on both of said pawls.

5. A sequential timer according to claim 4, wherein said one of said pawls is driven at twice the frequency of said another pawl.

6. A sequential timer according to claim 1, wherein the disc is driven at higher rate of advance when said switches are operated.

* * * * *